Patented Dec. 12, 1939

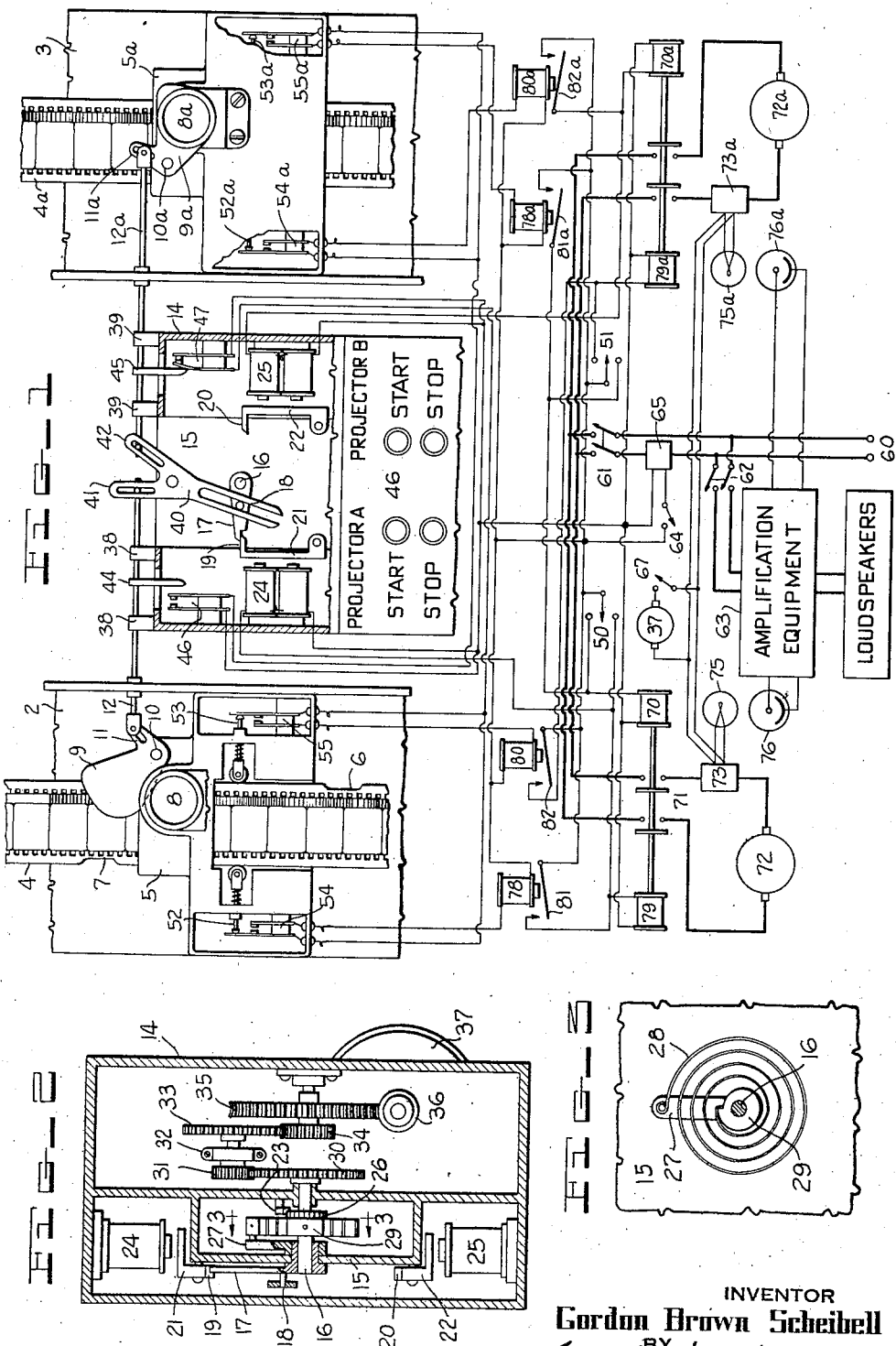

2,182,823

UNITED STATES PATENT OFFICE 2,182,823

SOUND FILM SYSTEM

Gordon Brown Scheibell, Millburn, N. J.; William O. Scheibell, administrator of said Gordon B. Scheibell, deceased Continuation of application Serial No. 443,398, April 11, 1930. This application January 16, 1935, Serial No. 2,134

15 Claims. (Cl. 179—100.3)

My invention pertains in general to the art of reproducing sound from film records and specifically relates to a control system for reproducing a continuous program from a plurality of film records.

The principal object of the invention consists in providing a change-over system for continuously producing sound from a plurality of film recorded sound tracks in succession so that the program continues without audible interruption through the different sound tracks.

Another object of the invention resides in the provision of an arrangement for controlling sound reproduction apparatus for reproducing sound from plural sound records to effect interdependent operation.

A further object comprises providing controllable means for effecting coordination between different operable parts of a film sound reproducing system.

A still further object consists in producing an arrangement utilizing a quick-acting device for producing controlling operations in a sound reproduction organization using film records.

These and other desirable objects will be apparent from the following, reference being had to the accompanying drawing forming a part of this specification and in which like reference numerals designate corresponding parts throughout. In the drawing:

Fig. 1 is a schematic representation of one embodiment of a sound reproduction control system according to my invention;

Fig. 2 is a horizontal sectional view of a quick-acting control unit employed in the representation of Fig. 1; and Fig. 3 is a fragmentary view taken along the line 3—3 of Fig. 2.

In its broadest aspects, this invention contemplates an arrangement for continuously reproducing a sound program from a plurality of film tracks utilized one after the other in succession without interruption. According to my invention, suitable optical means, film feeding mechanism, and control circuits are provided in conjunction with a quick-acting mechanism for effecting controlling and coordinating operations to continuously energize a sound reproducing circuit from successive sound tracks without interruption. The present application deals with the control of independent sound projectors, each adapted to utilize a film having both picture and sound recorded thereon. The present invention, therefore, is specifically concerned with the provision of automatic means for effecting the timed and coordinated operation of plural projectors for operation in producing a continuous visual and sound program. This automatic mechanism includes a quick-acting trigger arrangement, the operation of which is initiated at predetermined times in accordance with definite movement of the films in the respective projectors.

Referring to the drawing in detail, and particularly to Fig. 1, there are provided two sound moving picture projectors 2 and 3. These projectors are of a standard make for projecting moving pictures and reproducing sound, with the exception that certain modifications are provided to carry out the present invention, as will be hereinafter apparent. The projectors 2 and 3 are shown only partially in the drawing but it is understood that these projectors include motion picture projection means, driving mechanism and other equipment usually found in such apparatus. The portion of the projectors 2 and 3 specifically shown in the figure is that part of the individual mechanism of each in which the photoelectric cell system is disposed.

In the projector 2, a casing 5 is provided through which the sound film 4 passes in its travel from the supply reel to the take-up reel in a projection operation. The film 4 is provided with a series of picture frames and an adjacent sound track in the usual manner and is especially provided with notches 6 and 7 upon opposite edges thereof, the purpose of which will be pointed out later.

The housing 5 includes the necessary apparatus usually found in such projectors for directing light through the sound track on the film 4 to a photoelectric cell while maintaining the film in proper spatial feeding relation for sound reproduction purposes. The constructional features of this arrangement are not shown in detail since they form standard equipment in commercial projectors. The optical system is aligned with the sound track on the film 4 and, as shown, includes a lens tube 8 intermediate the film and the photoelectric cell. This lens tube is secured by suitable mounting to the housing 5 and is provided with a transverse slot through which a shutter 9 is adapted to closely move. This shutter 9 is pivoted by a member 10 to the housing 5 and is designed to optically obstruct the lens tube 8 when in a lowered position and to permit the clear passage of light therethrough when in an upper position, thus controlling the light incident on the photoelectric cell and the consequent reproduction of sound from the film 4.

The shutter 9 includes an ear 11 to which a shift rod 12 is pivotally secured. The rod 12 extends through a suitable reciprocative bearing in the structure of the projector 2 to a special control unit provided intermediate the projectors 2 and 3 in accordance with my invention.

The projector 3 includes parts such as described in connection with the projector 2, the corresponding parts bearing similar reference numerals with the addition of the designation a. The control unit provided intermediate the projectors 2 and 3 includes a housing 14 which is shown partially broken away in Fig. 1 to disclose an intermediate mounting panel 15. An arm 17 is adapted to rotate in a plane parallel with the surface of panel 15 and is freely mounted upon a shaft 16. The rotation of arm 17 is interrupted by abutments 19 and 20 which form integral parts of armatures 21 and 22, respectively, which are pivoted upon the panel 15. Suitable spring members, not showing in the drawing, are provided for urging the armatures 21 and 22 into a position such that the abutments 19 and 20 intercept the path of rotation of arm 17. Electromagnets 24 and 25 are mounted upon opposite walls of the housing 14 for respectively actuating armatures 21 and 22 to release the arm 17 from either one of two diametrically opposed arrested positions.

Attention will now be given to further mechanical details of this control unit. Referring to Fig. 2, it will be seen that the arm 17 includes a hub extending through the panel 15 and which is mounted upon the shaft 16. Mounted on this hub upon the opposite side of the panel 15 is an arm 27, secured to rotate in unison with the arm 17. The arm 27 is provided with a pin which is secured with the outer end of a coil spring 28. The inner end of the spring 28 engages with a hub member 29 rigidly mounted upon the shaft 16. Upon the shaft 16 there is also mounted a ratchet 26 and a spur gear 30. The ratchet 26 is engaged by a pawl 23 for preventing unwinding of spring 28. The spur gear 30 engages with a smaller spur gear 31 rotatably mounted through a bearing member 32 secured to a part of the housing 14. The shaft bearing the gear 31 is provided with another gear 33 which engages with a smaller spur gear 34. The smaller spur gear 34 is mounted upon a shaft carrying a gear journaled in a suitable bearing secured to the housing 14. This shaft carrying the gear 34 also carries a worm gear 35 engaged by a worm 36 driven by a shaft carried by a motor 37. The motor 37 transmits rotary motion at a greatly reduced speed to the hub member 29 through the train of reduction gears. The slow rotation of hub member 29 tends to produce a winding effect upon the spring 28 which produces a torque urging the rotation of arm 27, the arm 27 thus producing a rotary counter-clockwise force acting upon the arm 17. Thus the effect of the spring 28 is to continuously urge the arm 17 in a counter-clockwise path of rotation, the actual rotation of the arm being arrested by the oppositely positioned abutments 19 and 20. The release of either of the abutments 19 and 20 permits a very sudden 180° rotation of the arm 17 to the next arrested position. It will be understood that such an arrangement comprises a trigger device for producing extremely quick mechanical action, at selected times, for use as will be hereinafter apparent. On the outer side of the arm 17 a pin 18 is provided which engages in a slot provided in a yoke member 40. The yoke member 40 is pivoted upon the panel 15 and includes two projecting ears 41 and 42. The projecting ears 41 and 42 are provided with slots into which ends of the reciprocative rods 12 and 12a are respectively pivoted. When the arm 17 is released from either of its arrested positions it produces a sudden 180° rotation which acts upon the yoke member 40 to impart a reciprocative force to the rods 12 and 12a, simultaneously. Each successive 180° rotation of the arm 17 moves the rods 12 and 12a in alternate linear directions.

Referring to Fig. 1 it will be seen that the rods 12 and 12a pass through bearing members 38 and 39, respectively, mounted upon opposite sides of the top of the housing structure 14. At a point between the bearing members 38, the rod 12 is provided with an insulating member 44 which extends into the interior of the housing structure 14. Similarly, at a point between the bearing members 39, the rod 12a is provided with an insulating member 45 which extends into the interior of the opposite side of the housing 14. The member 44 is adapted to close or open an electrical switch 46 while the member 45 is adapted to open or close an electrical switch 47.

Beneath the panel 15, an electrical controlling panel 46 is provided and which is partially shown in Fig. 1. This panel includes the manually controllable elements for initiating the automatic operation of the control system of the invention and at the same time permitting manual change of the automatic controlling operations when required. That part of the panel 46 shown in Fig. 1 includes a representation of the buttons designated "Start" and "Stop" for projector A and for projector B, corresponding to the projectors 2 and 3, respectively. These buttons control diagrammatically represented switches 50 and 51, respectively, the functions of which will be better understood in connection with the electrical operation of the system. Other manual controlling means may also be provided upon the panel 46, such as knobs and handles for controlling other electrical switches in the system of my invention, particularly those associated with the power control circuits and the amplification equipment.

Consideration will now be given to certain electrical controlling operations which are performed by the films fed through the projectors 2 and 3. In the housing 5, upon opposite sides of the path of the film 4, are two reciprocative plunger members 52 and 53. One end of the plunger member 52 is provided with a small roller adapted to engage an edge of the film 4 while the other end of the plunger member 52 is adapted to open or close an electric switch 54. The plunger member 53 is similarly designed to act upon the other edge of the film 4 and to operate an electric switch 55. Suitable springs are provided for urging the plunger members 52 and 53 into engagement with the respective edges of the film 4. A similar arrangement is provided for the projector 3, the mechanical and electrical counterparts of the elements of projector 2 being designated by similar reference numerals with the addition of the designation a.

The remainder of the elements in the system of my invention will now be disclosed in connection with the description of the operation of the system as a whole. It will be assumed that it is desired to initiate the operation of the projection apparatus for producing sound and visual programs. For this purpose, one of the projectors, for example projector 2, may be loaded with film for projection purposes. The film, such as film 4, is then threaded from the supply reel through the intermittent picture projection apparatus and through the sound housing 5 and thence to the take-up reel. The switches 54 and 55 will be in the position shown in Fig. 1 and the shutter 11 will be in an upward position permitting the light to pass through the lens tube 8 to the photoelectric cell. The quick-acting control apparatus will be in the position shown in Fig. 1 in which the shift rods 12 and 12a are in a right-hand shifting position due to the rotatable arm 17 being in arrested position against the abutment 19.

The terminals 60 connect with the commercial power supply. Switches 61 and 62, connected therewith, are closed for supplying commercial power to the amplification equipment 63 and to the circuits which operate the projectors 2 and 3. Switch 64 is also closed, which delivers energy to an energy supply circuit at a suitable level from transformer equipment 65 connected in the power circuit from terminals 60. Another switch 67 is also closed for energizing a circuit to the motor 37 which operates the quick-acting trigger control device upon the energization of either projector 2 or projector 3.

After such preliminary steps, the momentary "Start" button on panel 46 is depressed to initiate the operation of projector A which is projector 2. The depression of this button closes the switch 50 momentarily in an upward direction, thus completing a circuit from the transforming and energy supply equipment 65 to a solenoid 70. Momentary energization of solenoid 70 effects the closure of a double pole switch 71 which supplies energy from a circuit extending from the terminals 60 to a motor 72 and energy supply equipment 73. The motor 72 forms part of the projector 2 for producing the necessary driving motion to move the film in a program projection operation while the equipment 73 supplies current suitable for energizing the light source 75 which supplies necessary illumination for projecting light through the sound track on the film 4 and through lens tube 8 to a photoelectric cell 76, it being understood that this apparatus is included in the projector 2.

The photoelectric cell 76 is connected with the amplification system 63. Energization of the motor 72 and lamp 75 initiates operation of the projector 2 so that the film is fed intermittently through the picture projection system and continuously through the sound housing 5. The photoelectric cell 76 is energized in accordance with the sound track and controls amplification equipment 63 to reproduce the sound program over the loud speakers in conjunction with the visual pictures projected upon a screen adjacent the loud speakers. The notches 6 and 7 are provided in the sides of the film at predetermined distances with respect to the termination of the visual and sound record upon the film 4. When the notch 6 passes through the housing 5 the plunger 53 is thereby permitted to move longitudinally to permit the closure of the switch 55 as a step anticipating the immediate termination of the program. Closure of the switch 55 completes an energization circuit from equipment 65 to a magnet 80. Energization of magnet 80 actuates normally spring-retained armature 82 to complete a circuit from energizing equipment 65 to magnet 79a which completes a circuit from the terminals 60 to motor 72a which drives the moving parts of projector 3.

The notch 6 on film 4 is spaced at an interval such as to permit the proper initiation of operation of the projector 3 as represented by energization of motor 72a and lamp 75a, in anticipation of a change-over from projector 2 to projector 3. When this energization of projector 3 is completed the film 4a will be beginning a feeding operation. The notch 7 along the other edge of film 4 is spaced so as to provide an interval sufficient to permit energization of electromagnets which permit the release of the quick-acting control mechanism at the exact moment that the end of the sound track reaches the lens tube 8. At this precise moment, the beginning of the sound track on film 4a will be in a position in alignment with the lens tube 8a so that the program can be transferred from one projector to the other without interruption.

When the notch 7 passes through the sound housing 5, the plunger 52 is actuated to permit closure of switch 54, thereby completing an energizing circuit from energization equipment 65 to magnet 78. The magnet 78 then operates normally spring-retained armature 81 to complete a circuit to solenoid 79 and to electromagnets 24. The energy supply circuit from the energization source 65 to the switches 54 and 55 is completed through switch 47. Energization of solenoid 79 causes the opening of switch 71 with the consequent de-energization of motor 72 and lamp 75, while the energization of magnets 24 causes the actuation of armature 21 which results in the release of the spring driven trigger arm 17. However, these operations are so timed, by constructional details, that the energization of magnets 24 precedes the opening of switch 71. The release of this arm 17 results in an extremely quick rotation effect which produces a shift of the rods 12 and 12a resulting in the optical obstruction of the lens tube 8 by shutter 11 simultaneously with the removal of shutter 11a from the optical path through lens tube 8a. This action operates so quickly that the sound program is transferred from one sound track to another substantially without audible interruption to produce a continuous program effect. The shift of the yoke 40 also results in the opening of switch 47 and the closure of switch 46. The opening of switch 47 interrupts the energization supply to switches 54 and 55 so that further actuation of plunger 52 and 53 produces no controlling effect upon the associated electrical circuits. Such controlling effects might otherwise be produced due to the completion of the run of the film 4 through the projector 2. A suitable circuit is provided between energy supply equipments 73 and 73a for supplying energy of a suitable value to the motor 37 during controlled energization of either projector 2 or projector 3.

The program will now have been transferred to projector 3 and the projector 2 will be in an idle condition, thereby permitting the removal of the film 4 and the substitution of another film for an ensuing part of the program. When the film 4a has been completely fed through the projector 3, a notch corresponding to notch 6 in film 4 will actuate plunger 53a to cause a closure of switch 55a. This action completes a circuit to magnet 78a, actuating armature 81a. Armature 81a completes a circuit from the energization equipment 65 to solenoid 70 which closes switch 71 to initiate the further operation of projector 2 in anticipation of a further change-over operation. When a notch in the film 4a corresponding to the notch 7 in film 4 reaches the plunger 52a, the switch 54a will be closed, thereby completing an energizing circuit to magnet 80a. The energization of magnet 80a will close armature 82a to complete a circuit to solenoid 70a and to magnets 25. Energization of magnets 25 causes the immediate release of the arm 17 in its arrested position adjacent the abutment 20. The release of the arm 17 causes another shift in the movable parts controlled thereby to again assume a position such as shown in Fig. 1, thus effecting a further change-over from projector 3 to projector 2 without audible interruption. At the same time, the energization of magnet 70a causes the shut-down of the motor 72a and lamp 75a in projector 3. It will be noted that the energization supply from equipment 65 to switches 54a and 55a is completed through switch 46 which is in a closed position during the operation of projector 3. When the arm 17 is released from its latched position under retention of armature 22, the switch 46 is opened, thereby preventing any controlling operation due to subsequent operation of plunger 52a and 53a when the film has been run through the projector 3 and the projector 3 is being again loaded. It will thus be seen that a continuous program recorded in a plurality of parts can be continuously reproduced throughout the parts by means of the automatic change-over operations effected without perceptible interruption by the system of my invention.

Further contingencies which sometimes arise may be provided for by controlling features of the system. For example, assume that for some reason the film 4 breaks in the projection 2 during a projection operation. When the film breaks, the plunger 52 will be moved, thus completing the energization circuit to the magnets 24 which results in an immediate change-over to the other projector 3. A reverse action, of course, would take place, should the film 4a break while the projector 3 is in operation.

The system may also be governed manually when required. For example, while the projector 2 is in operation, it might be desired to make a change-over to the projector 3 without waiting for the termination of the film. The operator then merely depresses the "Start" button under "Projector B" and then the "Stop" button under "Projector A" which results in the initiation of operation of projector 3 and the shut-down of projector 2.

Although the system has been described in a preferred embodiment, it will be recognized that variations, modifications and changes may be made without departing from the intended scope of the invention. I do not therefore desire to limit myself to the foregoing except as pointed out in the appended claims.

I claim:

1. In a reproduction system a continuous program recorded in parts on a plurality of film tracks, means for moving said film tracks, photosensitive means, a sound reproducing circuit under control of said photosensitive means, means for effectively producing and directing light through a selected one of said film tracks to said photosensitive means for the reproduction of a part of said program, and quick-acting means including a mechanical trigger arrangement automatically operative at a predetermined movement of said selected film track for causing the sudden effective direction of light through another film track for the reproduction of another part of said program whereby said entire program is continuously reproduced by said sound circuit under control of said film tracks one after the other substantially without interruption throughout said film tracks.

2. A sound film system comprising, a plurality of film recorded sound tracks, a sound amplification circuit, and operating means for energizing said amplification circuit consecutively under control of said sound tracks to continuously reproduce a program, said means including film moving mechanism having motor driving means, and means for energizing said motor driving means including an arrangement comprising movable switching means and automatic means for operating said switching means at a change-over from one sound track to another, said automatic means including a separate motor driven unit for operating said switching means.

3. A system in accordance with claim 2 in which said switching means includes at least two different motor circuit connections, said arrangement operating to prepare a subsequent connection before opening the preceding one to sustain a continuous motor driving operation.

4. A system in accordance with claim 2 in which said operating means includes an electrical means for producing irradiations for said sound tracks, said means being electrically controlled by said movable switching means.

5. A sound film system comprising, a program recorded in parts on a plurality of photographic sound tracks, means for producing irradiations for said sound tracks including illumination circuits, photosensitive means subject to said irradiations, a sound amplification circuit controlled by said photosensitive means, means for moving said sound tracks to control said photosensitive means and including electrical driving means, sound transfer means for effecting a transfer of control of said photosensitive means from one of said sound tracks to another while preserving a continuity of reproduction of said program by said amplification circuit, switching means for controlling said illumination circuits and said electrical driving means, and automatic control means for concomitantly operating said sound transfer means to change from one track to another and said switching means to produce a change in the condition of control of said illumination circuits and said electrical driving means, for reproducing a continuous program from said film track one after the other.

6. A system in accordance with claim 5 including manually operable means for exerting control on said switching means in addition to the control thereof by said automatic control means.

7. In sound projection apparatus, a program recorded in parts in a plurality of projectors, a lamp and motor in each of said projectors, control circuits for each of said projectors leading respectively to the lamp and motor thereof, a sound track shutter in each of said projectors a sound reproducing circuit common to said projectors, a mechanical trigger arrangement for operating said shutters to transfer a sound projection continuity from one projector to another, and means operative under control of the film in each of said projectors for initiating the operation of the lamp and motor of one projector before the end of the sound track is reached in the operation of the other of said projectors, said mechanical trigger arrangement being operative to actuate said shutters at the effective termination of said sound track.

8. In combination, a plurality of phonographs; an automatic system connected with all of said phonographs and energizable to maintain the same in sequential operation, said automatic system including a plurality of stopping means for the several phonographs respectively; and means operable selectively to energize said automatic system and to actuate the stopping means of all operating phonographs.

9. The combination claimed in claim 11, further including system starting means comprising means operable only when said automatic system is energized to start a single one of said phonographs.

10. In combination, a plurality of phonographs; an automatic system connected with all of said phonographs and energizable to maintain the same in sequential operation, said automatic system including a plurality of starting means for the several phonographs respectively; and means operable selectively to concomitantly actuate a single one of said starting means and energize said automatic system, and to place all said phonographs out of operation.

11. In combination, a plurality of phonographs; an automatic system connected with all of said phonographs and energizable to maintain the same in sequential operation; switch means throwable selectively to place all said phonographs out of operation and to energize said automatic system; and normally open switch means closable to start a single one of said phonographs, said two switch means being so mutually associated that momentary closure of the second mentioned thereof throws the first mentioned thereof to energize said automatic system.

12. In combination, a plurality of phonographs; an automatic system connected with all said phonographs and energizable to maintain the same in sequential operation; switch means throwable selectively to energize said automatic system and to place all said phonographs out of operation; and starting means for said plurality comprising means, associated with said switch means for operation concomitantly with system-energizing throwing thereof, for starting a single one of said phonographs.

13. In combination, a plurality of phonographs; an automatic system connected with all of said phonographs and including a plurality of starting means for the several phonographs respectively, said automatic system being energizable to maintain said phonographs in sequential operation; and system starting means, including openly biased switch means momentarily closable to actuate a single one of said starting means.

14. The combination claimed in claim 13, wherein the switch means is selective with respect to the several said phonograph starting means.

15. In combination, a plurality of phonographs; an automatic system connected with all of said phonographs and including a plurality of starting means and a plurality of stopping means for the several phonographs respectively, said automatic system being energizable to maintain said phonographs in sequential operation; and system starting means, including switch means closable to actuate the said starting means of a single one of said phonographs and arranged after closing to open at least as soon as the stopping means of that phonograph is actuated by said automatic system.

GORDON BROWN SCHEIBELL.